United States Patent [19]

Vranish et al.

[11] Patent Number: 4,950,987

[45] Date of Patent: Aug. 21, 1990

[54] MAGNETO-INDUCTIVE SENSOR FOR PERFORMING TACTILE AND PROXIMITY SENSING

[75] Inventors: John M. Vranish, Crofton; Pradeep K. Yadav, Bladensburg, both of Mass.

[73] Assignee: University of North Carolina at Charlotte, Charlotte, N.C.

[21] Appl. No.: 319,411

[22] Filed: Mar. 3, 1989

[51] Int. Cl.⁵ ............... G01B 7/14; G01R 33/00; B25J 19/00; B25J 15/02

[52] U.S. Cl. .............. 324/207.23; 324/207.26; 324/207.13; 324/226; 324/227; 324/207.14; 324/207.15; 324/207.17; 901/33; 901/35; 901/46

[58] Field of Search ............... 324/207, 208, 226, 227, 324/262; 901/10, 30, 33, 35, 46

[56] References Cited

U.S. PATENT DOCUMENTS

| | | | |
|---|---|---|---|
| 3,046,361 | 7/1962 | Wiehl ................... | 324/208 |
| 4,541,771 | 9/1985 | Beni et al. ............ | 414/730 |
| 4,588,348 | 5/1986 | Beni et al. ............ | 414/730 |
| 4,766,389 | 8/1988 | Rhoades et al. ..... | 901/33 |

FOREIGN PATENT DOCUMENTS 844267 7/1981 U.S.S.R. .
925624 5/1982 U.S.S.R. .

OTHER PUBLICATIONS

Magnitoinductive Skin for Robots, John M. Vranish, 1986.
IBM Technical Disclosure Bulletin, "Sensor Arrangement on Robotic Overload Protection Structure," vol. 25, No. 8, Jan. 1983.

Primary Examiner—Reinhard J. Eisenzopf
Assistant Examiner—Walter E. Snow
Attorney, Agent, or Firm—Bell, Seltzer, Park & Gibson

[57] ABSTRACT

The present invention discloses a single sensor performing both tactile and proximity sensing. The sensor includes a magnetic field generator, a magnetic field sensor for sensing changes in the magnetic field in response to an object changing position with respect to the field to provide proximity sensing. By providing for relative movement between the response to the object touching the sensor, tactile sensing is provided.

34 Claims, 4 Drawing Sheets

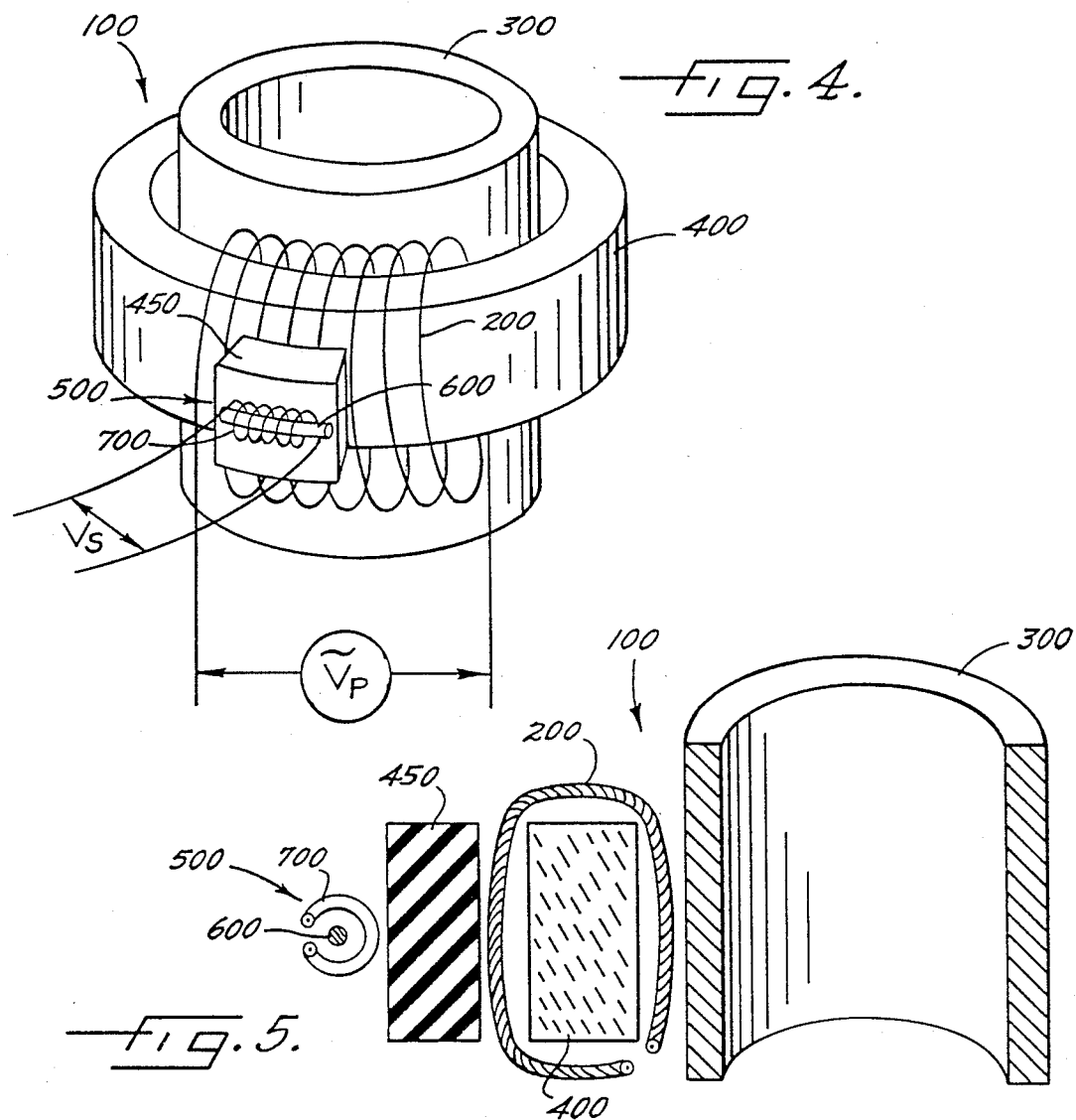
fig. 4.
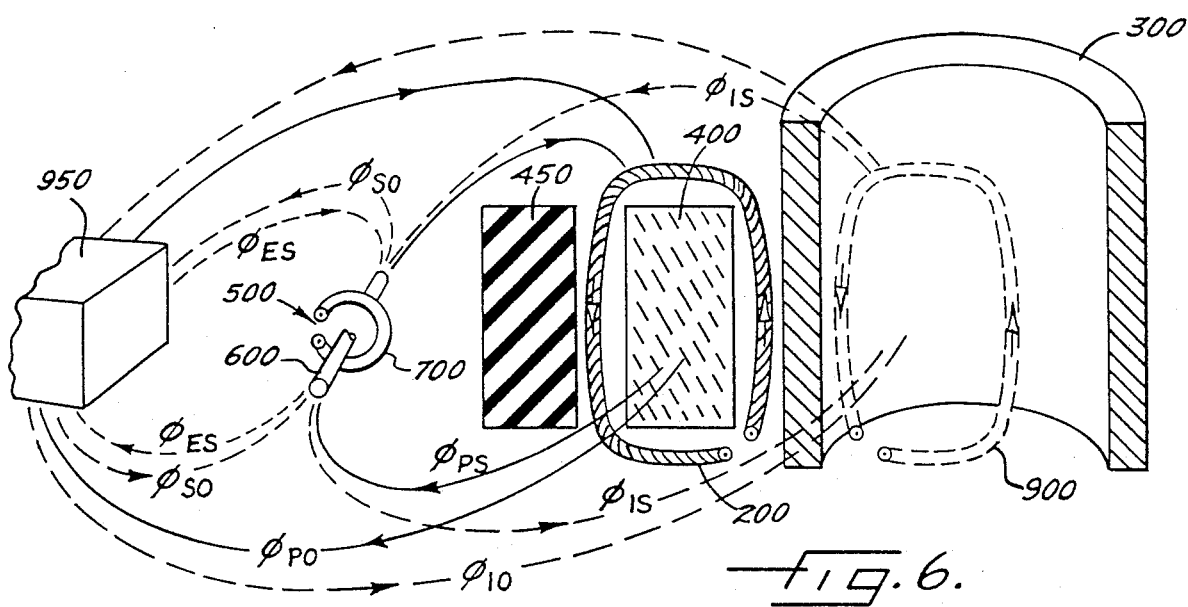
fig. 5.
fig. 6.

MAGNETO-INDUCTIVE SENSOR FOR PERFORMING TACTILE AND PROXIMITY SENSING

FIELD OF THE INVENTION

The present invention relates to sensors, and more particularly to sensors for performing both proximity and tactile sensing.

BACKGROUND OF THE INVENTION

There exists a great need for a single sensor capable of effectively performing both tactile and proximity sensing. In the sensor field, numerous types of tactile sensors and numerous types of proximity sensors have been proposed. However, in order to provide proximity and tactile sensing, one or more sensors of each type must be provided, resulting in undue complexity and cost. The art has not yet provided tactile and proximity sensing within a single sensor.

An example of a tactile sensor is disclosed in U.S. Pat. No. 4,588,348 to Beni, et al. This patent discloses a tactile sensor array and clearly states that it cannot perform proximity sensing (Col. 7, lines 35-37) and must be employed with a separate proximity sensor system to achieve proximity sensing. An example of a proximity sensor is disclosed in U.S. Pat. No. 4,541,771 also to Beni, et al. This patent also fails to provide both types of sensing. Beni '771 explicitly points to the fact that in order to provide both tactile and proximity sensing, a separate tactile sensing system must be employed (Col. 1, lines 50-54). It is significant to note that even while the inventors on each of these patents were the same and filed within only two months of each other, the inventors failed to combine both types of sensing in a single system as does the present invention.

In addition, many sensing devices can detect only magnetic objects. However, to be useful in a wide range of operating environments, there is a great need for sensors that can detect non-magnetic objects as well as magnetic objects.

SUMMARY OF THE INVENTION

It is an object of the present invention to provide a single sensor for both tactile and proximity sensing.

It is another object of the present invention to provide for efficient tactile and proximity sensing in a single system.

It is a further object of the present invention to provide a sensor which will detect magnetic and non-magnetic objects.

These and other objects of the present invention are met by providing a tactile and proximity sensor in which a magnetic field generator generates a magnetic field, and a magnetic field sensing means senses changes in the magnetic field in response to an object changing position with respect to the magnetic field to provide proximity sensing. The sensor is constructed to allow relative movement between the magnetic field generator and the magnetic field sensing means in response to the object touching the sensor, so that the magnetic field sensing means moves relative to the magnetic field generated by the magnetic field generator to provide tactile sensing.

According to the invention, the magnetic field generator may be a coil wound on a core; for example, an inductor, solenoid or toroid, through which a sinusoidal voltage is applied to generate a magnetic field. The magnetic field sensing means may be another coil for sensing changes in the magnetic field in response to an object. A compressible insulator may be provided between the two coils so that the magnetic field sensing means is moved towards the magnetic field generator when the object touches the sensor. Alternatively, one or more of the coils may be provided with compressible insulation to provide relative movement. Multiple sensor coils may surround a single generator coil to provide a tactile and proximity sensing skin, e.g., for a robot. A simple and reliable combined proximity and tactile sensor may be provided.

BRIEF DESCRIPTION OF THE DRAWINGS

FIG. 4 shows a second embodiment of the present invention.

FIG. 5 is a cutaway view of the embodiment of FIG. 4.

FIG. 6 shows the flux lines of the embodiment of FIG. 4 during operation.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiment set forth herein; rather, applicants provide this embodiment so that this disclosure will be thorough and complete, and will fully convey the scope of the invention to those skilled in the art.

Like characters refer to like elements throughout. For greater clarity, the size of the elements has been exaggerated.

Figure 1:
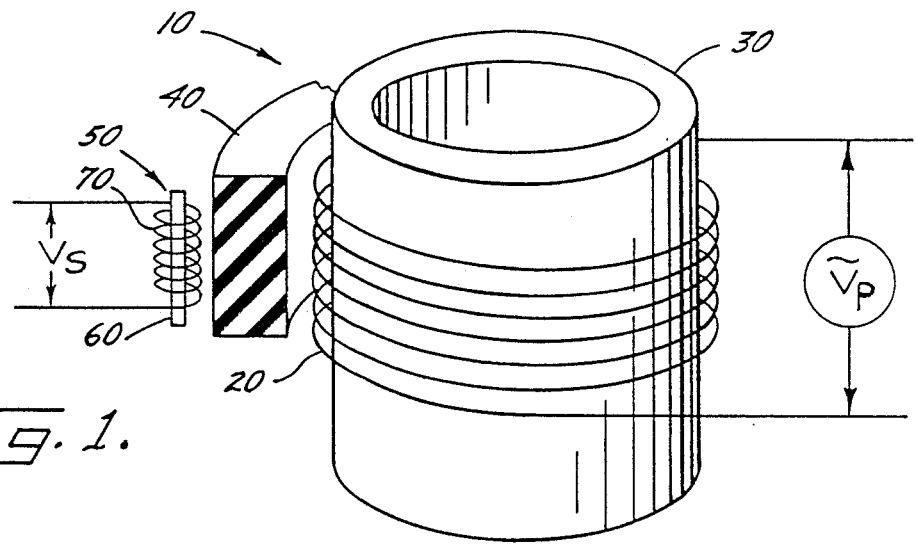
FIG. 1 illustrates a first embodiment of the present invention.
Figure 8:
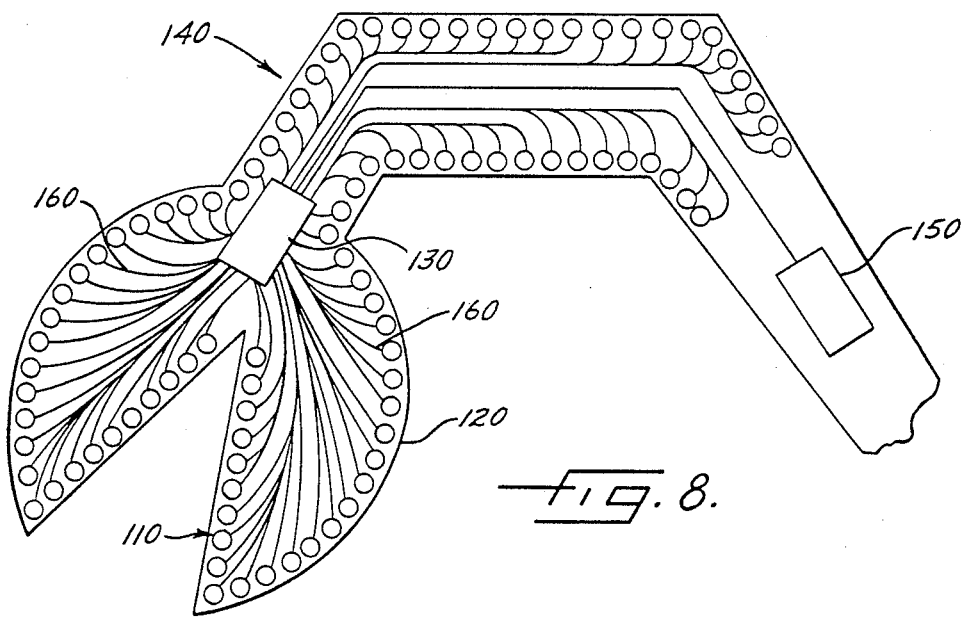
FIG. 8 is a diagram showing the array of sensors on the robot.

Referring now to FIGS. 1, and 8 a first embodiment of a single sensor element of the present invention is shown. In operation, the sensor elements may be combined into an array 110 of such elements forming a "skin" 120 on a surface of the robot. Typically, a system would have several drive coils and on each drive coil, several sensor coils. By scanning the active drive coil and providing means 130 for monitoring the voltage on monitoring its sensing coils one at a time, proximity and tactile sensing for an array which covers the entire robot or arm 140 or skin 120 is obtained.

In a first embodiment of the present invention, a magnetic field generating means 20 is wrapped around a conductive base 30 which is preferably non-magnetic. In this embodiment, the magnetic field generating means is a solenoid. The magnetic field sensing means 50 is comprised of a magnetic core 60 and a sensor coil 70. The core 60 is preferably microminiature and made of METGLAS. METGLAS is an Allied Signal Corp trademark for amorphous metallic glass. It is used for high performance transformer core material. The core 60 is wrapped by a sensor coil 70. Means for providing relative movement between the magnetic field generating means and the magnetic field sensing means in response to an object 95 touching said sensor is provided here by a compressible insulator 40 (preferably rubber and about ⅛" thick). An applied sinusoidal voltage $V_P$ is applied to coil 20. A second voltage $V_S$, which is a function of the location of an object to be detected, is generated at coil 70.

The core for the sensor coil is preferably made of five amorphous metal fibers composed of iron, silicon, and boron, each of which has a 0.005 inch diameter. These fibers may be coated with a thin layer of insulation to minimize core demagnetization. The sensing means 50 is placed on top of the flexible insulator 40 which is in turn placed on top of the drive coil 20. Preferably, the sensor is approximately 0.50 m long.

Figure 2:
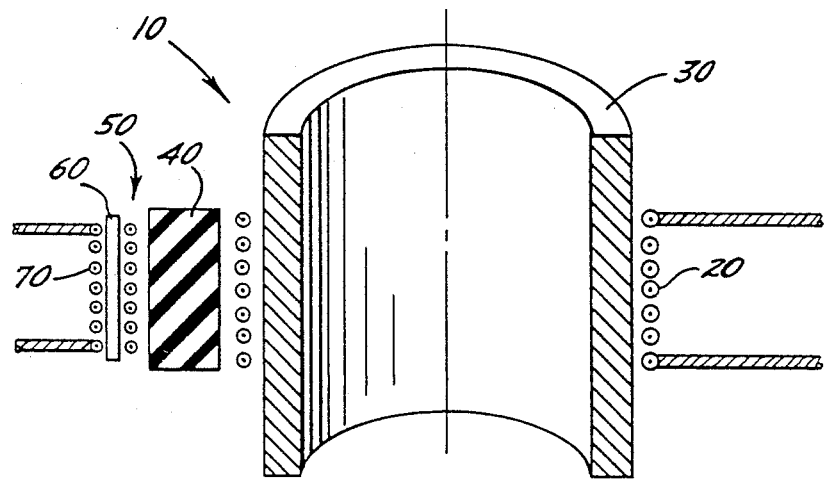
FIG. 2 is a cutaway view of the embodiment of FIG. 1.

FIG. 2 illustrates a schematic cutaway view of the sensor unit 10 of FIG. 1.

Figure 3:
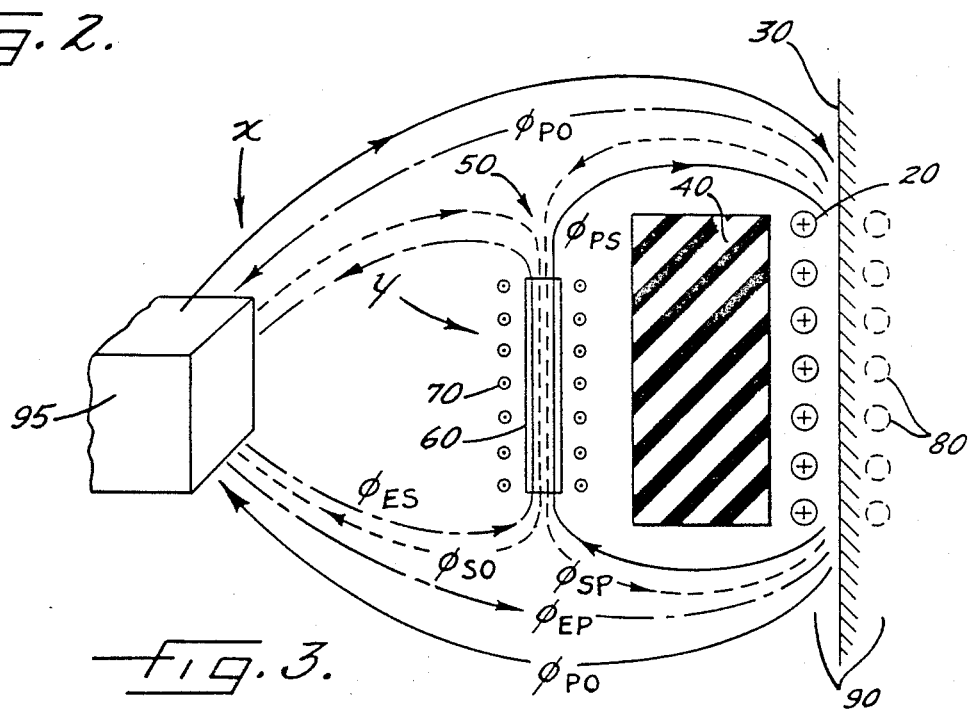
FIG. 3 shows the flux lines in the embodiment of FIG. 1 during operation.
Figure 7:
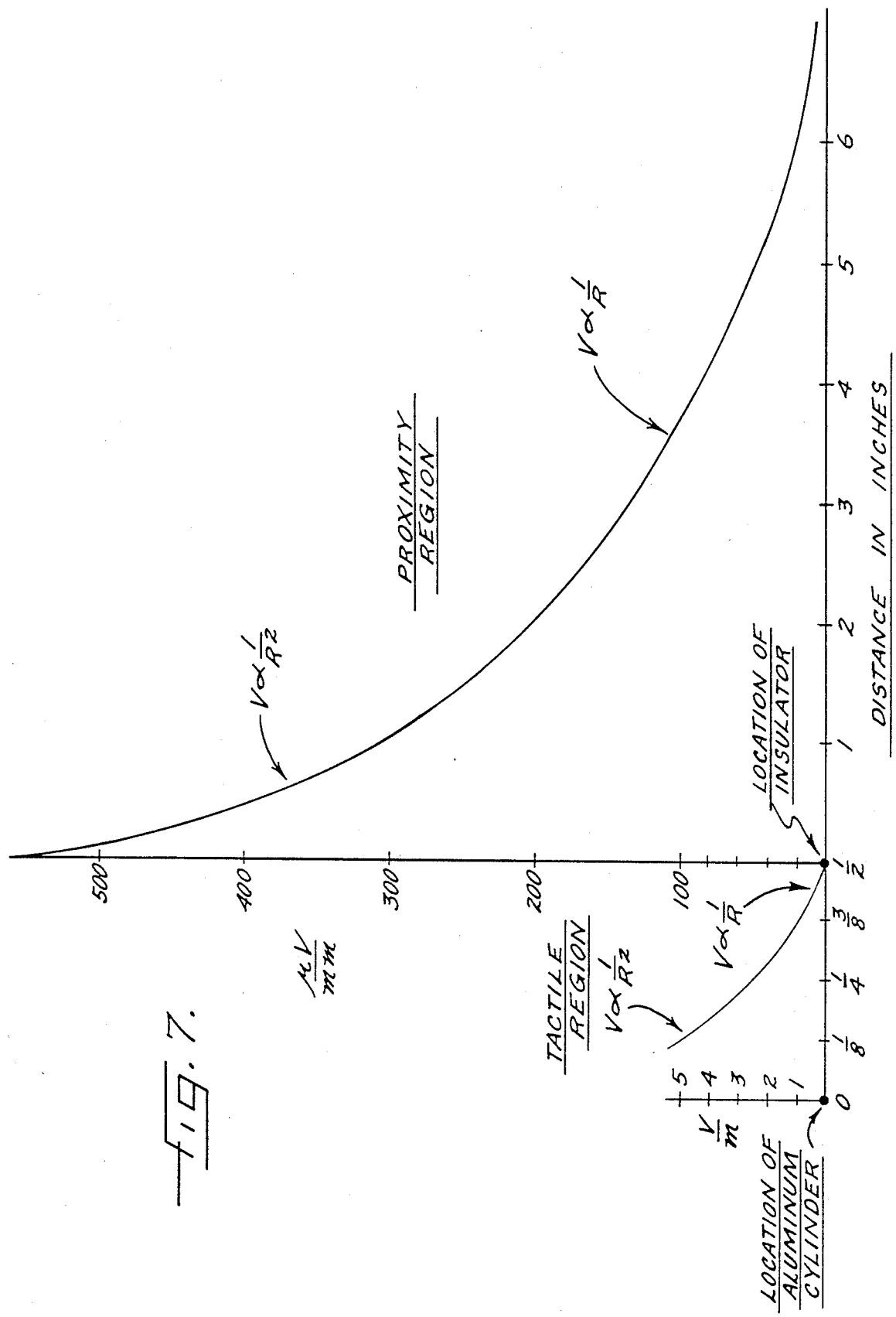
FIG. 7 graphically illustrates the electric signal generated by a sensor of the present invention versus the distance of an object from the sensor.

Referring now to FIGS. 3, and 8 the sensor unit is shown during operation. In operation, proximity sensing is provided as follows. The magnetic field generating means 20 provides a magnetic field shown by the various flux lines $\phi$. When an object 95 enters the field at X, the magnetic field sensing means 50 senses the change in the magnetic flux $\phi$ and transmits an electric signal on line 160 in response thereto. The electric signal on line 160 is received by the means for detecting voltage 130 and transmitted to the means 150 for controlling the robot 140. Various means 150 for controlling the robot 140 are well known to those skilled in the art and will not be further discussed herein. As the object 95 moves within the magnetic field relative to the magnetic field sensing means 50, the electric signal on line 160 sent in response to the changes varies, as shown in FIG. 7.

Tactile sensing is provided by providing for relative movement between the magnetic field generating means 20 and the magnetic field sensing means 50 when the sensor unit is touched by the object 95. For example, this occurs at Y on FIG. 3 when the object comes in contact with the sensing means 50 or a skin which overlies the sensing means. Upon the occurrence of this relative movement, sensing means 50 generates sends an electrical signal on sensor coil 70 indicative of the event. This can be seen graphically at Y in FIG. 7.

More particularly, in this embodiment, the drive coil 20, which in this embodiment is the magnetic field generating means, is driven by an a.c. current source. The amount of current required will vary with the particular type of magnetic core 60 used. The current required is inversely proportional to magnetic permeability of the core. The current in the drive coil 20 generates an image current 80 in the conductive base 30, thus forming a solenoid structure 90. The primary magnetic flux $\phi_{PS}$ and $\phi_{PO}$ passes through the sensor element and the approaching object, respectively. Change in $\phi_{PS}$ provides the signal for tactile sensing upon the relative movement of the sensing means 50 and generating means 20.

The fluxes, such as $\phi_{PS}$ and $\phi_{PO}$ generate eddy currents of their own which, in turn, generate their own magnetic eddy current fluxes (i.e., $\phi_{ES}$). These eddy current secondary fluxes, $\phi_{ES}$, provide the signal to the sensor element 50 for proximity sensing upon entry or movement of the object 95 within the magnetic field. This signal occurs as follows: The sensor is always reading the primary flux ($d\phi_P/dt$). The secondary flux enters the sensor core and subtracts from the primary flux. The sensor reads this change ($d(\phi_P - \phi_S)/dt$).

A third type of sensing performed by the present invention occurs when the approaching object 95 generates a magnetic field (either a.c. or d.c.) or perturbates the sensory magnetic field during to is ferromagnetism. The sensor elements perceive this as an a.c. signal or d.c. shift in bias and will send out a signal indicating this measurement. Thus, three modes of sensing occur: a proximity mode, a tactile mode, and a mode which measures the d.c. magnetic field emanating from the object.

The fluxes seen in FIG. 3 are defined as follows:
$\phi_{PO}$: from primary solenoid to object
$\phi_{EP}$: the current flux from object to primary coil
$\phi_{SP}$: eddy current flux from sensor to primary coil
$\phi_{PS}$: from primary solenoid to sensor element
$\phi_{ES}$: eddy current flux from object to sensor element
$\phi_{SO}$: eddy current flux from sensor to object In the proximity mode, the sensor actually senses the change in the primary flux caused by the opposing eddy currents (or eddy current flux) induced in the approaching conducting object 95 $\phi_{ES}$ (FIG. 3). The following formula describes the operation of the system. The rate of decrease in the sensor voltage with decreasing distance was measured at about 30 uV/mm when the object was 5.5 inches away. This rate of decrease grew to 80 uV/mm when the object was about 4.5 inches away. For short ranges, the rate of decrease became increasingly larger.

$$\frac{dV}{dr} = \frac{C\, W^2\, B_o A\, \sigma_2}{4\, \pi^2\, T\, r^2\, \mu_a\, \sigma_1} \quad (FPS\ Units)$$

and $$B = \frac{8\, \pi \mu_a\, \mu_c\, N_1\, N_2}{\sqrt{2}\, D^2}$$

where,
P = Perimeter of the approaching object in the sensor plane
A = Area of the Approaching object in the sensor plane
T = Cross-sectional thickness of the object orthogonal to the sensor plane
r = distance (Range) of the sensor coil from the approaching object at any instance
$\mu_a$ = Permeability of the approaching object
C = A constant which depends upon the geometry of the Base metal
$B_0$ = Magnetic Flux density at sensor due to the Primary and its Image current
D = Distance between the base metal and sensor
$N_1$ = Number of turns in Primary Coil
$N_2$ = Number of turns in Sensory Coil In the tactile sensing mode, as the sensor is pressed, the distance between the two coils (primary and sensor) reduces as the rubber between them compresses. This reduction causes more flux linkage through the sensor coil and results in an increment in sensor voltage. The relationship is described as:

$$\frac{dV}{dx} = \frac{C\, \mu_c\, \sigma_1\, \sigma_2\, w\, N_1\, N_2}{4\, \pi\, x^2\, K} \quad (FPS\ Units)$$

$\sigma_1$ = Conductivity of the base metal $\sigma_2$ = Conductivity of the approaching object
K = Force constant of the rubber
w = Distance between Primary and Sensor coil at any instance
$N_1$ = Number of turns in Primary Coil
$N_2$ = Number of turns in Sensor Coil
$\mu_C$ = Permeability of the core of Sensor coil
C = A constant which depends upon the geometry of the Base, on which Primary is mounted
(For 4" dia. Aluminum cylinder 'C' was found to be about $6 \times 10^9$).

Referring now to FIG. 4, a second embodiment of the sensor unit 100 is shown. The second embodiment is similar to the first embodiment except that the primary drive coil 200 is wrapped around the compressible insulator 400, rather than the conductive base 300. In this manner, the range of each sensor unit is increased and augmented since a larger primary flux is obtained with a smaller amount of drive coil because the coil is not wrapped around the aluminum cylinder to form a single drive coil loop.

In the second embodiment, the sensing means 500 consists of the sensor coil 700 wrapped around the magnetic core 600 as in the first embodiment. In the second embodiment, a second insulator 450 is added between the sensor element 500 and the primary drive coil 200. This insulator is typically made of hard rubber and should be flexible with low compression.

Referring now to FIG. 5, a cutaway view of the second embodiment shown in FIG. 4 is shown.

Referring now to FIG. 6, the second embodiment of the present invention is shown during operation. The second embodiment operates in the same general manner as the first embodiment but more specifically, the primary drive coil acting as the generating means 200 is driven by an a.c. current which will vary with the type of magnetic core 600 used. The current in the drive coil 200 generates an image current and solenoid 900 in the nonmagnetic conductive base 300. The magnetic flux $\phi_{PS}$ and $\phi_{PO}$ pass through the sensing means 500 and the approaching object 950, respectively. Change in $\phi_{PS}$ provides the signal for tactile sensing.

The fluxes $\phi_{PS}$ and $\phi_{PO}$ in turn generate eddy currents of their own which, in turn, generate their own magnetic eddy current fluxes (i.e., $\phi_{ES}$). The change in eddy current fluxes provides the signal to the sensing means 500 for proximity sensing of an approaching object 950. The d.c. magnetic field emanating from the approaching object 950 can also be sensed in the same manner as the first embodiment of the present invention.

Referring now to FIG. 6, the flux lines shown in FIG. 6 are defined as follows:
$\phi_{PO}$: from primary solenoid to object
$\phi_{PS}$: from primary solenoid to sensor element
$\phi_{IO}$: from imaging solenoid to object
$\phi_{IS}$: from imaging solenoid to sensor element
$\phi_{ES}$: eddy current flux from object to sensor element
$\phi_{SO}$: eddy current flux from sensor element to object In an alternative embodiment of the invention, the sensor elements can be inside the drive solenoid 20, 200; but with a slight penalty in range because of the sensor element's increased distance from the "skin" surface.

The present invention senses flux on the sides of its coils rather than coming out of the ends; thus allowing individual sensors to be arranged in the form of a thin, flexible array. The near field range of the sensor elements is increased by the position of the primary coil being placed against conductor 300 thereby creating image coil 900 which diffuses the primary and eddy current flux associated with the primary flux into a larger area. The present invention gathers detailed information about the approaching object because of the tiny size of each sensor element and the fact that there are a very large number of them in an array.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A proximity and tactile sensor for sensing an object, comprising:
   magnetic field generating means;
   magnetic field proximity and tactile sensing means positioned within said magnetic field for sensing changes in the magnetic field generated by said magnetic field generating means in response to said object changing position within said magnetic field to provide proximity sensing; and
   means mounting said magnetic field generating means and said magnetic field proximity and tactile sensing means for relative movement in response to said object moving at least a portion of said sensor, whereby said magnetic field proximity and tactile sensing means senses a change in the magnetic field in response to said relative movement to provide tactile sensing.

2. The sensor of claim 1 wherein said magnetic field generating means is a solenoid.

3. The sensor of claim 1 wherein said solenoid comprises a core and winding therearound and means for providing an electric current in said winding.

4. The sensor of claim 3 wherein said core comprises a hollow, nonmagnetic cylinder.

5. The sensor of claim 3 wherein said means for providing an electric current comprises means for providing sinusoidal electric current in said winding.

6. The sensor of claim 1 wherein said magnetic field proximity and tactile sensing means comprises a sensor coil for producing an induced voltage as a function of the magnetic field around said coil.

7. The sensor of claim 1 wherein said magnetic field proximity and tactile sensing means is an inductor.

8. The sensor of claim 7 wherein said inductor comprises a core and a winding for producing an induced voltage.

9. The sensor of claim 8 further comprising means for detecting the voltage in said winding to provide proximity and tactile sensing signals.

10. The sensor of claim 1 wherein said mounting means comprises a resilient member between said magnetic field generating means and said magnetic field proximity and tactile sensing means.

11. The sensor of claim 1 wherein said magnetic field generating means comprises a solenoid, wherein said magnetic field sensing means comprises an inductor, and wherein said mounting means comprises a compressible insulating ring between said inductor and said solenoid.

12. The sensor of claim 1 wherein said magnetic field proximity and tactile sensing means comprises a winding mounted adjacent said magnetic field generating means, and wherein said mounting means comprises compressible insulation on said winding.

13. A robotic system comprising:

a robot;
an array of single magneto-inductive sensing means carried by said robot, each of said single sensing means providing both tactile and proximity sensing;
means in said single magneto-inductive sensing means for generating a signal in response to a nearby object; and
means responsive to said signal for controlling said robot.

14. The robotic system of claim 13 wherein said single sensing means comprises:
a non-magnetic conductive base;
a sensor core element;
a sensor winding surrounding said sensor core element;
insulating means positioned between said conductive base and said sensor winding;
a primary winding surrounding one of said insulating means and said conductive base, said primary winding for carrying an electric current;
whereby said electric current in said primary winding produces a magnetic field which results in generation of said signal.

15. The robotic system of claim 14 wherein said array of single magneto-inductive sensing means is located on a movable arm of said robot.

16. The robotic system of claim 14 wherein said sensor windings are coated with a thin coating of insulation.

17. The robotic system of claim 14 wherein said insulating means comprises a compressible insulator.

18. A sensing apparatus performing both tactile and proximity sensing, comprising:
a base;
a proximity and tactile sensor element;
a sensor winding surrounding said tactile and proximity sensor element;
insulating means positioned between said base and said proximity and tacticle sensor element; and
a primary winding surrounding one of said insulator and said base, said primary winding for carrying an electric current
to generate a magnetic field inside and outside said sensing apparatus, to thereby produce a proximity and tactile strength signal in said sensor winding.

19. The sensor apparatus of claim 18 wherein said sensor element comprises a magnetic core.

20. The sensor apparatus of claim 18 wherein said sensor apparatus is located on a movable arm of a robot.

21. The sensor apparatus of claim 18 wherein said sensor winding is coated with a thin coating of insulation.

22. The sensor apparatus of claim 21 wherein said insulation comprises compressible insulation.

23. Apparatus for sensing both the approach of an object and contact of the object with the apparatus and comprising a single magneto-inductive sensor element means for generating a first signal in response to said object approaching said apparatus and for generating a second signal in response to said object moving at least a portion of said apparatus.

24. The apparatus of claim 23 wherein said single magneto-inductive sensor element comprises a single electromagnetic element.

25. The apparatus of claim 24 wherein said single electromagnetic element comprises a coil.

26. The apparatus of claim 24 further comprising means for generating an electromagnetic field outside said apparatus.

27. A proximity and tactile sensor for sensing an object, comprising:
magnetic field generating means;
magnetic field sensing means positioned within said magnetic field for sensing changes in the magnetic field generated by said magnetic field generating means in response to said object changing position within said magnetic field to provide proximity sensing; and
means mounting said magnetic field generating means and said magnetic field proximity and tactile sensing means for relative movement in response to said object moving at least a portion of said sensor, whereby said magnetic field proximity and tactile sensing means senses a change in the magnetic field in response to said relative movement to provide tactile sensing;
wherein said magnetic field generating means comprises a solenoid having a core and winding therearound and means for providing an electric current in said winding; and wherein said core comprises a hollow nonmagnetic cylinder.

28. A proximity and tactile sensor for sensing an object, comprising:
magnetic field generating means;
magnetic field sensing means positioned within said magnetic field for sensing changes in the magnetic field generated by said magnetic field generating means in response to said object changing position within said magnetic field to provide proximity sensing; and
means mounting said magnetic field generating means and said magnetic field sensing means for relative movement in response to said object moving at least a portion of said sensor, whereby said magnetic field proximity and tactile sensing means senses a change in the magnetic field in response to said relative movement to provide tactile sensing;
wherein said magnetic field sensing means comprises an inductor and having a core and a winding for producing an induced voltage;
said proximity and tactile sensor further comprising means for detecting the voltage in said winding to provide proximity and tactile sensing signals.

29. A proximity and tactile sensor for sensing an object, comprising:
magnetic field generating means;
magnetic field sensing means positioned within said magnetic field for sensing changes in the magnetic field generated by said magnetic field generating means in response to said object changing position within said magnetic field to provide proximity sensing;
means mounting said magnetic field generating means and said magnetic field sensing means for relative movement in response to said object moving at least a portion of said sensor, whereby said magnetic field proximity and tactile sensing means senses a change in the magnetic field in response to said relative movement to provide tactile sensing; and
wherein said magnetic field generating means comprises a solenoid, wherein said magnetic field sensing means comprises an inductor, and wherein said mounting means comprises a compressible insulating ring between said inductor and said solenoid.

30. A robotic system comprising:
a robot;
an array of single sensing means carried by said robot, each of said single sensing means providing both tactile and proximity sensing;
means in said single sensing means for generating a single in response to a nearby object; and
means responsive to said signal for controlling said robot;
each of said single sensing means comprising:
a non-magnetic conductive base;
a sensor core element;
a sensor winding surrounding said sensor core element;
insulating means positioned between said conductive base and said sensor winding; and
a primary winding surrounding one of said insuating means and said conductive base, said primary winding for carrying an electric current;
whereby said electric current in said primary winding produces a magnetic field which results in generation of said signal.

31. The robotic system of claim 30 wherein said array of single sensing means is located on a movable arm of said robot.

32. The robotic system of claim 30 wherein said sensor windings are coated with a thin coating of insulation.

33. The robotic system of claim 30 wherein said insulating means comprises a compressible insulator.

34. Apparatus for sensing both the approach of an object and contact of the object with the apparatus and comprising a single sensor element means for generating a first signal in response to said object approaching said apparatus and for generating a second signal in response to said object moving at least a portion of said apparatus; wherein said single sensor element comprises a single electromagnetic coil.

* * * * *

UNITED STATES PATENT AND TRADEMARK OFFICE
CERTIFICATE OF CORRECTION

PATENT NO. : 4,950,987

DATED : August 21, 1990

INVENTOR(S) : John M. Vranish, et al.

It is certified that error appears in the above-identified patent and that said Letters Patent is hereby corrected as shown below:

On the title page, the correct state of residence of the inventors is Maryland.

Column 6, line 59, after the word "field", insert -- proximity and tactile --.

Column 7, line 47, delete the word "strength" and insert therefor -- sensing --.

Column 9, line 11, delete the word "single" and insert therefor -- signal --.

Column 10, line 1, delete the word "insuating" and insert therefor -- insulating --.

Signed and Sealed this

Twenty-eighth Day of January, 1992

Attest:

HARRY F. MANBECK, JR.

*Attesting Officer*   *Commissioner of Patents and Trademarks*